(12) United States Patent
Röst (10) Patent No.: US 10,989,312 B2
(45) Date of Patent: Apr. 27, 2021

(54) VALVE DEVICE

(71) Applicant: Bernt Erik Röst, Trondheim (NO)

(72) Inventor: Bernt Erik Röst, Trondheim (NO)

(73) Assignee: Camilla Grotte, Trondheim (NO)

(*) Notice: Subject to any disclaimer, the term of this patent is extended or adjusted under 35 U.S.C. 154(b) by 0 days.

(21) Appl. No.: 15/773,682

(22) PCT Filed: Nov. 4, 2016

(86) PCT No.: PCT/NO2016/050219
§ 371 (c)(1),
(2) Date: May 4, 2018

(87) PCT Pub. No.: WO2017/078541
PCT Pub. Date: May 11, 2017

(65) Prior Publication Data
US 2018/0328497 A1   Nov. 15, 2018

(30) Foreign Application Priority Data
Nov. 4, 2015   (NO) .................................. 20151494

(51) Int. Cl.
| F16K 3/03 | (2006.01) |
| F41A 21/34 | (2006.01) |
| F41A 21/30 | (2006.01) |
| F16K 17/04 | (2006.01) |
| F16K 17/36 | (2006.01) |
| F16L 55/10 | (2006.01) |

(52) U.S. Cl.
CPC ............ *F16K 3/03* (2013.01); *F16K 17/0453* (2013.01); *F16K 17/363* (2013.01); *F16L 55/10* (2013.01); *F41A 21/30* (2013.01); *F41A 21/34* (2013.01)

(58) Field of Classification Search
CPC ..... F16K 3/03; F16K 3/04; F16K 3/06; F16K 3/26; F16K 3/267; F16K 17/0453; F16K 17/363; F16K 17/00; F16K 17/22; F16L 55/10; F16L 55/1015; F16L 55/1022; F41A 21/34
See application file for complete search history.

(56) References Cited

U.S. PATENT DOCUMENTS

| 1,130,609 A | 3/1915 | Jones |
| 2,934,892 A * | 5/1960 | Hurlbert ................... F02K 1/10 |
| | | 138/45 |
| 4,460,151 A | 7/1984 | Williams, III et al. |
| 4,532,961 A * | 8/1985 | Walton .................... F16K 3/085 |
| | | 137/625.31 |

(Continued)

FOREIGN PATENT DOCUMENTS

| DE | 10352372 A1 | 6/2005 |
| EP | 2851592 A1 | 3/2015 |

OTHER PUBLICATIONS

International Search Report and Written Opinion dated Feb. 28, 2017 (PCT/NO2016/050219).

*Primary Examiner* — Kelsey E Cary
(74) *Attorney, Agent, or Firm* — Alix, Yale & Ristas, LLP (57) ABSTRACT

Valve device based on a closing disc formed by disc parts which are movably arranged on activation bolts extending between two stop discs, and where movement of the activation bolts or disc parts in longitudinal direction of the valve device results in that the relative position between the disc parts are changed and the valve device opens or closes.

17 Claims, 5 Drawing Sheets

(56) References Cited

U.S. PATENT DOCUMENTS

| | | | |
|---|---|---|---|
| 5,819,540 A * | 10/1998 | Massarani | F23R 3/26 60/732 |
| 6,666,237 B2 * | 12/2003 | De Antoni Migliorati | B65B 39/005 141/286 |
| 2008/0121298 A1 | 5/2008 | Norrman | |

* cited by examiner

VALVE DEVICE

BACKGROUND

The disclosure is related to a valve device, and more particularly to a valve device for fluid, liquid or gas. A typical application for the valve device disclosed herein is as a stop valve/safety valve, but it can also be modified to an adjustable valve.

The valve device can be used for fluid, liquid or gas in all thinkable applications where it is necessary to close rapidly and safely, e.g. blow-out preventer or other similar safety valves, in a sound directing and/muzzle flash dampening device, or as an adjustable device in a pipeline or similar for transport or control of fluid, liquid or gas.

A lack of prior art valve devices is that they are custom-made for the actual application, and that they often do not provide a rapid and safe opening or closing.

It is further a lack of known valve devices is that they require external manipulation for opening or closing.

In the most valve device which are adjustable it is required that sensor means are arranged which provide information to an actuator which further shall open or close the valve.

It is accordingly a need for a valve device which does not need to be custom-made to the actual application, but can be used in all kinds of applications independent of it is fluid, gas or liquid.

It is further a need for a valve device where one does not need external manipulation for opening, closing or adjusting the valve device, at the same time as one with simple modifications can make it adjustable.

SUMMARY

The disclosed embodiments provide a valve device which entirely or partly solves the lacks of prior art.

Embodiments of a valve device are arranged for even closing/opening for fluid, liquid or gas in the valve device.

The disclosed embodiments further provide for rapid and secure closing or opening of fluid, liquid or gas.

Embodiments of the valve device can function as a balancing valve, arranged such that pressure in front or behind the valve device activates movable parts of the valve in greater or lesser degree, and maintains the flow (of fluid, liquid or gas) at a desired level/velocity.

Further provided herein is a controllable valve device or a valve device that comprises a controllable actuator mechanism for adjustment of properties of the valve device.

The valve device according to a first embodiment is formed by an outer tube which at one end thereof is provided with a connection/fastening device to existing tube, pipeline or similar, and which at its other end is provided with a corresponding connection to tube, pipeline or similar, such that the mentioned valve device can be arranged between two tube sections or similar, transporting fluid, liquid or gas. The mentioned connection/fastening device can possibly also be formed by a reinforced cover.

In another embodiment, the valve device is formed by an outer tube which at one end thereof is provided with a connection/fastening device to a barrel of a firearm, such that the mentioned valve device can be arranged in the extension of the barrel of the firearm. At the other end of the valve device there is arranged a (reinforced) cover which exhibits a central hole adapted for passing of a projectile fired via the barrel of the firearm.

The valve device further comprises a closing mechanism which is formed by stop discs arranged movably to bolts or rods extending in longitudinal direction of the valve device, between mentioned connections/fastening devices/cover, i.e. at inside of the tube, or where the stop discs are fixed to the bolts or rods which are movable in longitudinal direction and the stop discs are therethrough movable in longitudinal direction of the valve device.

The stop discs are separated in longitudinal direction of the valve device and are connected by at least three rods or activation bolts extending between the two mentioned stop discs with increasing or decreasing angle. The stop discs are further provided with a central through hole where fluid, liquid or gas can flow.

The valve device further comprises a closing disc formed by at least two disc parts, which are movably arranged to the mentioned at least three rods or activation bolts, between the mentioned stop discs. The mentioned disc parts exhibit slots of such a form and such angles that they are forced to change relative position as the movable rods/activation bolts in longitudinal direction of the valve device or that the rods/activation bolts move in the longitudinal direction of the valve device.

According to a further embodiment, the device comprises a cylindrical aperture box, fixed or movably arranged in the tube of the valve device, between the mentioned stop discs, which aperture box exhibits an inner cavity for accommodating the closing disc formed by at least two disc parts, and is provided with a central through hole as the first and second stop disc, and where it in connection with the central hole, i.e. outside the circumference thereof, also is arranged slots for the at least three rods or activation bolts which thus extend through the aperture box when this is arranged between the first and second stop disc.

I.e. that it in front of the first stop disc is formed a chamber which is filled with fluid, liquid or gas driving the first and second stop disc forward in longitudinal direction of the valve device, alternatively the aperture box. Correspondingly, there is formed a chamber behind the second stop disc, such that the valve device is to be considered as a bidirectional valve, and that it as well can be the second stop disc that moves, alternatively the aperture box, such that the valve device is closed from the opposite side. In this way the valve device also could function as a non return valve. The movement forwards or backwards of these stop discs/the aperture box results in that the disc parts slide along the mentioned rods/activation bolts and therethrough are forced towards the core line of the valve device where they form a closing mechanism and therethrough close the central through hole of the valve device in a rapid and secure manner supported by the stop disc.

The mentioned first and second stop disc may further be spring-loaded, or that the bolts or rods extending in longitudinal direction of the valve device themselves are spring-loaded, alternatively the aperture box, such that it is required a certain force before the closing mechanism is activated. The mentioned spring-functionality of the bolts/rods/aperture box/stop discs can further be used such that after the pressure in the mentioned chamber again drops, the rods/bolts/aperture box/stop discs are returned and the valve device again opens as the disc parts are forced from each other, outwards towards the inner diameter of the tube.

The mentioned valve device can further be considered as a module-based valve device where several such closing mechanisms, i.e. first and second stop discs, activation bolts, possibly aperture box, and closing disc in disc parts, can be arranged after one another in the same tube for increased safety or possibly close at different pressure.

The above mentioned closing mechanism can further be automated by that the mentioned stop discs or bolts/rods or aperture box is arranged to an actuator mechanism and therethrough the opening and closing can be adjusted by moving the stop discs/bolts/rods/aperture box in longitudinal direction of the valve device and therethrough determine the opening formed by the position of the disc parts in relation to each other.

The valve device can further be arranged as a balancing valve, arranged such that the pressure in front or behind the closing mechanism activates the valve parts in greater or lesser degree, and maintains the flow (of fluid, liquid or gas) at a certain level/velocity.

Further preferable features and details of the disclosed valve device will appear from the following example description.

BRIEF DESCRIPTION OF THE DRAWINGS

The present invention will be described in further detail below with references to the attached drawings, where.

DETAILED DESCRIPTION

Figure 1:
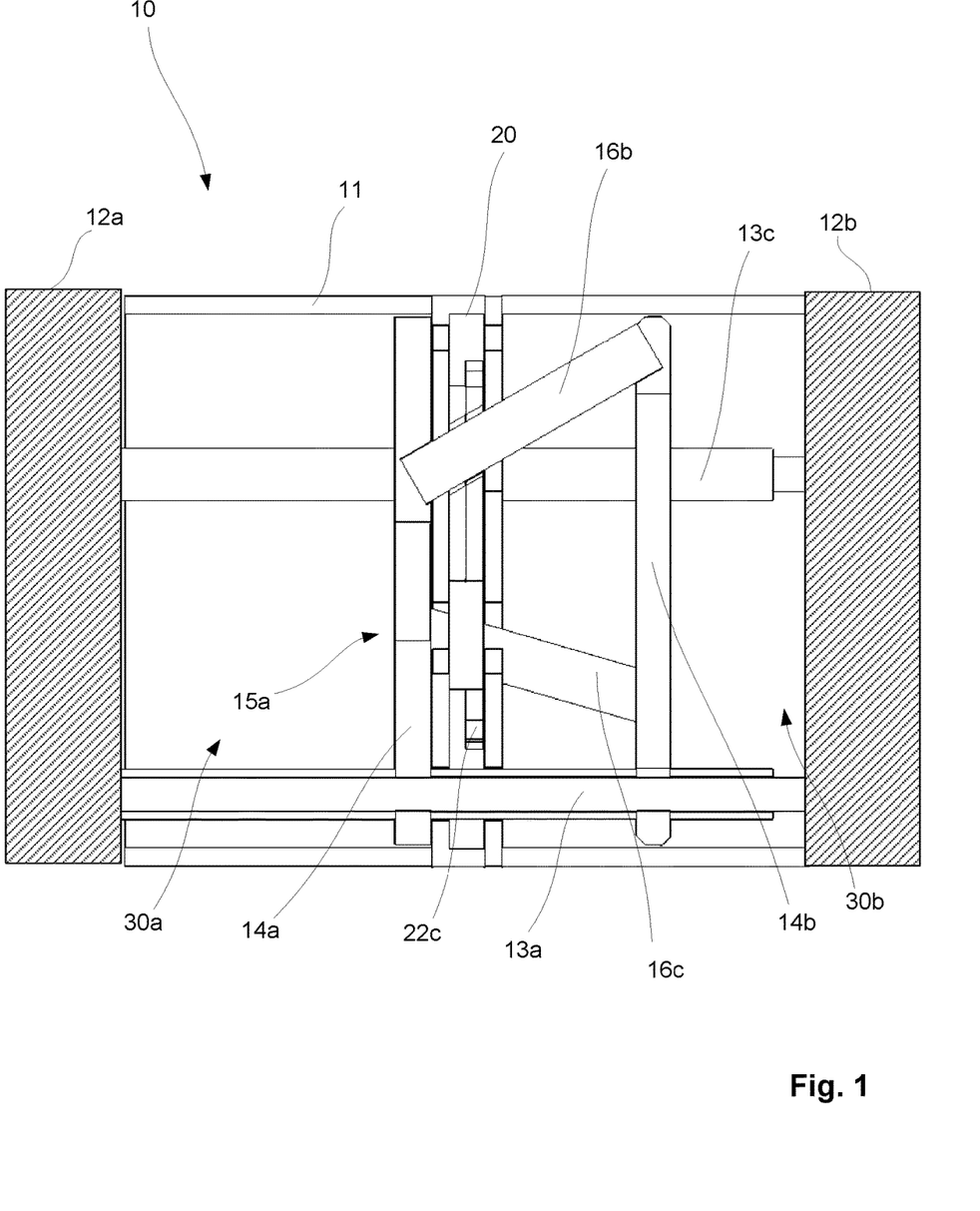
FIG. 1 is a principle drawing of an embodiment of the disclosed valve device in cross-section.
Figure 2:
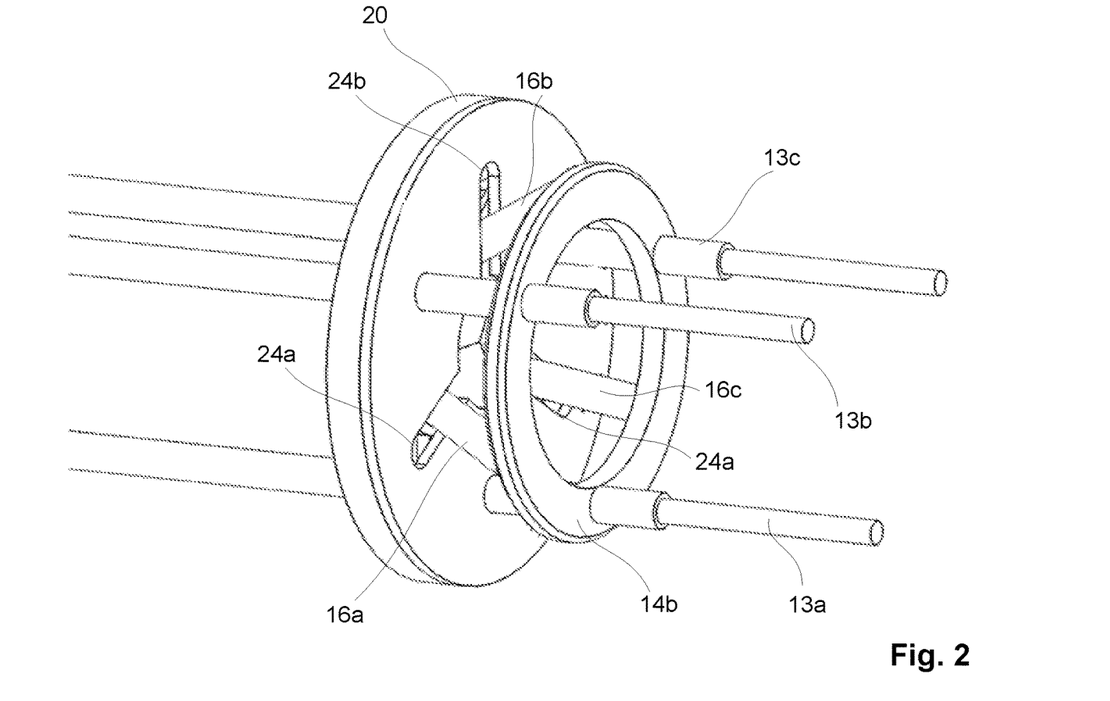
FIG. 2 shows details of the closing mechanism of the valve device, seen inclined from the front.
Figure 3:
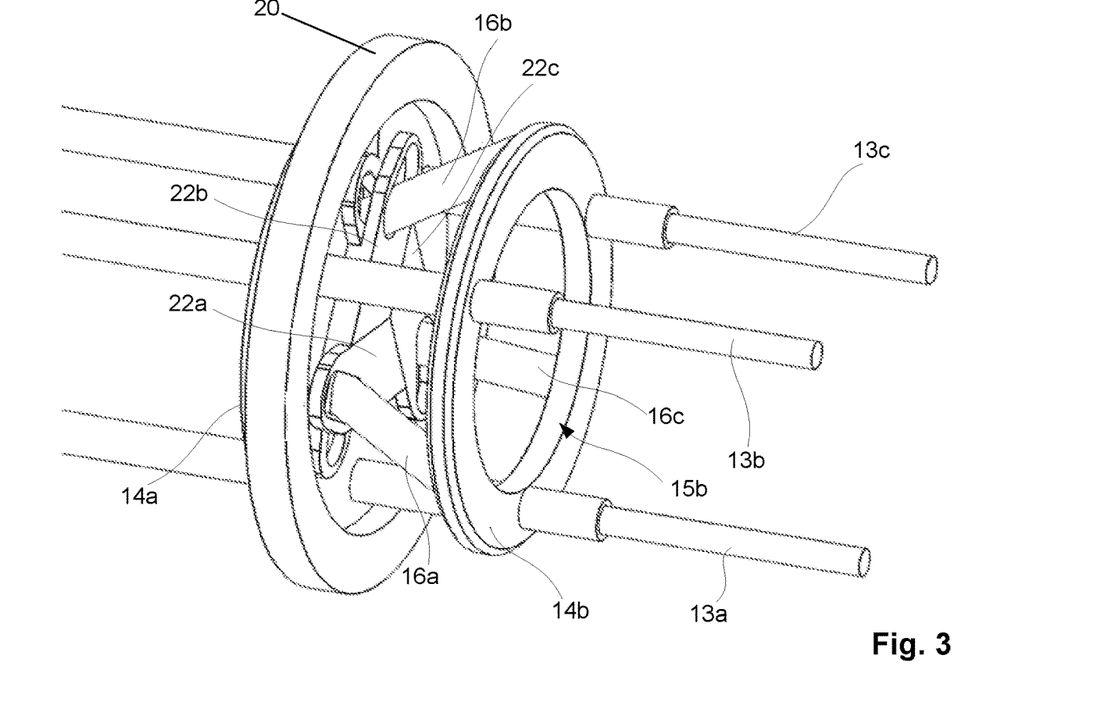
FIG. 3 shows details of the closing mechanism of the valve device in entirely closed position.
Figure 4:
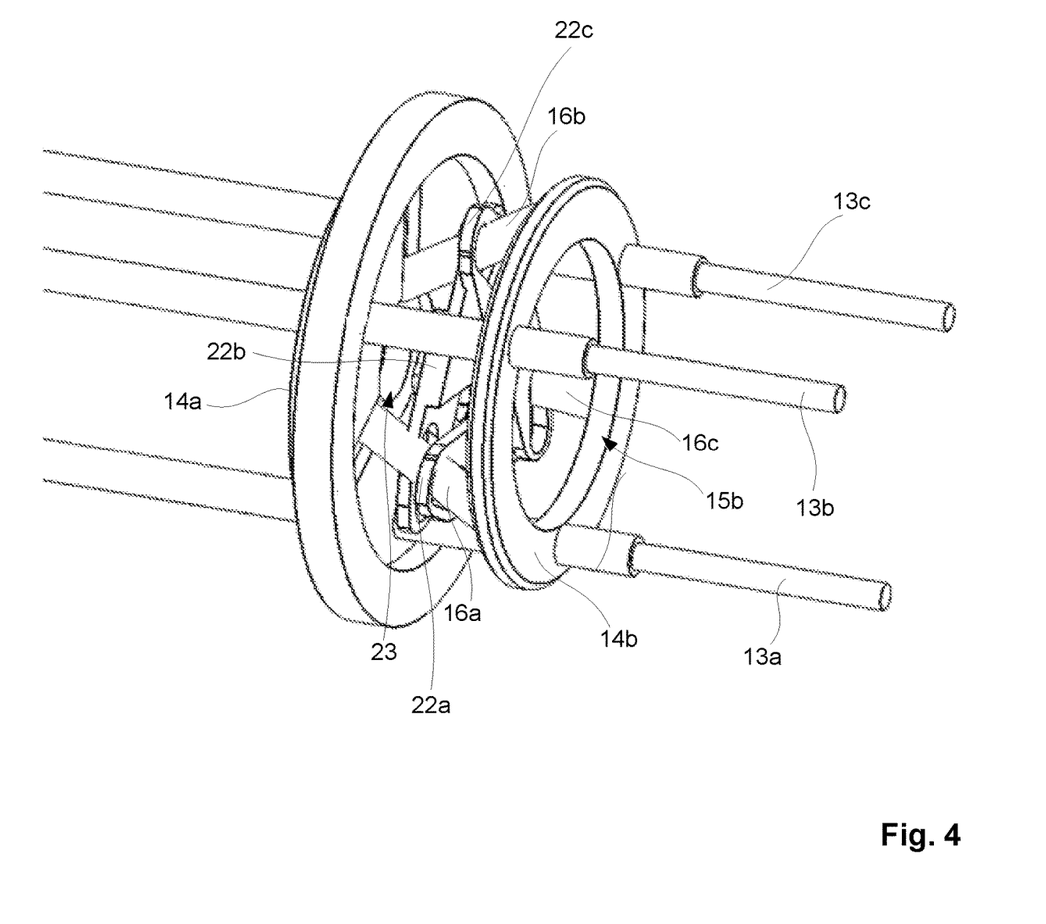
FIG. 4 shows detail of the closing mechanism of the valve device in partly open position.

Reference is now made to FIG. 1 which shows a principle drawing of a valve device 10 according to the disclosure, in a cross-sectional view, FIG. 2 showing details of the closing mechanism of the valve device, seen inclined from the front, where parts of the valve device 10 are removed for revealing inner details, FIG. 3 showing details of the closing mechanism in entirely closed position where parts of the valve device 10 are removed for revealing inner details, and FIG. 4 showing details of a closing mechanism of the valve device in partly open position where parts of the valve device 10 are removed for revealing inner details.

The valve device 10 is formed by an outer tube 11 which at one end thereof is provided with a connection/fastening device 12a for existing tube, pipeline or similar (not shown), and which at the other end thereof is provided with a corresponding connection/fastening device 12b for tube, pipeline or similar (not shown), such that the mentioned valve device 10 can be arranged between two tube sections or similar transporting fluid, liquid or gas.

The valve device 10 further comprises bolts or rods 13a-c extending in longitudinal direction of the valve device 10, between mentioned connections/fastening devices 12a-b/ cover 12c, i.e. inside the tube 11, which is distributed in circumferential direction of the tube 11, in the example three bolts or rods 13a-c which mutually form a triangular construction in the tube 11. In this way it is formed a strong construction.

The valve device 10 further comprises a first 14a and second 14b movable stop disc arranged to the mentioned bolts or rods 13a-c, which stop discs 14a-b are arranged with a distance from each other, seen in longitudinal direction of the valve device 10. The stop discs 14a-b are further provided with a central through hole 15a-b where fluid, liquid or gas can flow.

In an alternative embodiment of the valve device 10, the mentioned stop discs 14a-b are fixed arranged to the mentioned bolts or rods 13a-c which are arranged such that they are movable in longitudinal direction of the valve device 10 and therethrough also make the stop discs 14a-b movable in longitudinal direction of the valve device 10.

Between the first 14a and second 14b stop disc extend at least three rods or activation bolts 16a-c arranged in an angle relation to each other and which exhibit an increasing or decreasing angle, seen in longitudinal direction of the valve device 10, from the first stop disc 14a to the second stop disc 14b, in the example with increasing angle. It should be mentioned that these rods/activation bolts 16a-c are arranged such that they mutually and separately form triangles between the first 14a and second 14b stop disc.

The valve device 10 according to the above shown embodiment further comprises a cylindrical aperture box 20, fixed arranged in the tube 11 of the valve device 10, which aperture box 20 exhibits an inner cavity 21 for accommodating disc parts 22a-c, which is provided with a central through hole 23 as in the first and second stop disc 14a-b, and where it in connection with the central through hole 23, i.e. outside the circumference thereof, also are arranged slots 24a-c for the at least three rods or activation bolts 16a-c which thus extend through the aperture box 20 when this is arranged between the first and second stop disc 14a-b.

The closing disc of the valve device 10 is divided in at least two mainly crescent-shaped disc parts 22a-c, which disc parts 22a-c are arranged to the mentioned rods or activation bolts 16a-c and are arranged in the cavity of the mentioned aperture box 20. The mentioned disc parts 22a-c exhibit slots at their ends of such a shape and angle that the mainly crescent-shaped disc parts 22a-c are forced to change relative position as the rods/activation bolts 16a-c move forward in the longitudinal direction of the valve device 10 as a consequence of movement of the stop discs 14a-b. It shall be mentioned that the mentioned crescent-shaped disc parts 22a-c always are arranged to at least two of the mentioned rods/activation bolts 16a-c, and the disc parts 22a-c together with the rods/activation bolts 16a-c form triangles, both mutually and together with each other for reinforced construction. The shape of the mainly crescent-shaped disc parts 22a-c will further be designed such that they engage each other when they are moved towards each other such that they together form a disc which is entirely closed.

I.e. that it in front of the stop disc 14a is formed a chamber 30a filled with fluid, liquid or gas driving the first 14a and second 14b stop disc forward in longitudinal direction of the valve device 10. There is correspondingly formed a chamber 30b behind the second stop disc 14b, such that the valve device 10 is to be considered as a bidirectional valve and that it as well can be the other stop disc 14b that is moved, such that the valve device 10 closes from the opposite side. In this way the disclosed device also may function as a non return valve. The movement forwards or backwards of these stop discs 14a-b results in that the mainly crescent-shaped disc parts 22a-b slide along the mentioned rods/activation bolts 16a-c and therethrough are forced towards the core line of the valve device and in engagement with each other, and therethrough form a closing mechanism which closes the central through hole 15a in the first stop disc 14a in a rapid and secure manner supported by the first stop disc 14a.

The mentioned first 14a and second 14b stop discs may further be spring-loaded, or that the bolts or rods 13a-c extending in longitudinal direction of the valve device 10 themselves are spring-loaded, such that a certain force is required before the stop discs 14a-b are moved and the closing mechanism (disc parts 22a-c) is activated. The mentioned spring-functionality of the bolts/rods 13a-c or stop discs 14a-b can further also be used such that after the pressure again drops in the mentioned chamber 30a-b the rods/bolts 13a-c and stop discs 14a-b are returned and the closing mechanism opens again as the mainly crescent-shaped disc parts 22a-c are forced away from each other again, outwards towards the inner diameter of the mainly cylindrical aperture box 20.

It will be obvious for a skilled person that a natural modification of the valve device 10 will be that the closing mechanism comprises more than three crescent-shaped disc parts 22a-c overlapping each other, and also comprises more than three rods/activation bolts 16a-c.

Figure 5:
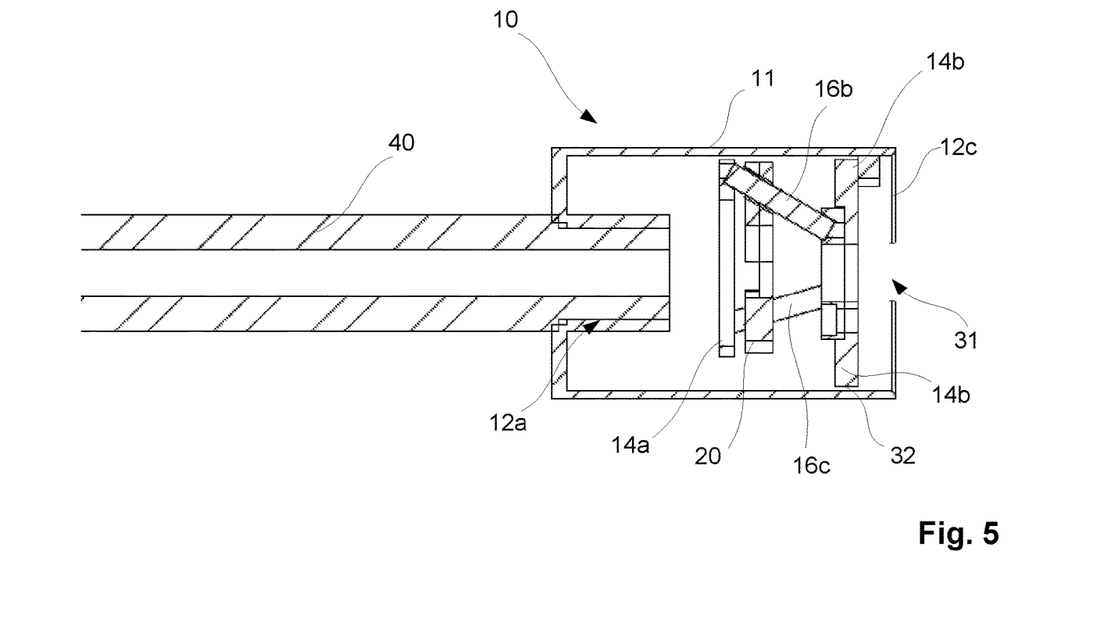
FIG. 5 shows an embodiment where the valve device is arranged to a barrel of a firearm.

Reference is now made to FIG. 5 showing a valve device 10 according to the disclosure arranged to a barrel 40 of a firearm. In this application the valve device 10 will function as a sound director and/or muzzle flash damper. In this application the valve device 10 comprises connection means 12a at the one end being used to attach the valve device 10 to the firearm barrel 40, i.e. forming a fastening device to the firearm barrel 40, and that the connection means 12a seals against the firearm barrel 40. This will typically be achieved by that the barrel 40 and connection means 12a are provided with corresponding threads such that the valve device 10 can be detachably attached to the barrel 40. There is further arranged a cover 12c at the other end of the valve device 10, which centrally is provided with a through hole 31 adapted for allowing a projectile fired via the firearm barrel 40 to pass. The bolts or rods 13a-c extending in longitudinal direction of the valve device 10, between the connection means 12a and the cover 12c, are not shown in the example.

In this application powder gases following the projectile on its way out of the firearm barrel 40 will hit the first stop disc 14a and therethrough move the first 14a and second 14b stop disc forward in longitudinal direction of the valve device 10, such that the closing mechanism closes as described above. Alternatively, the aperture box 20 is movably arranged between the first 14a and second 14b stop discs and that the power gases drive the aperture box 20 in longitudinal direction from the first stop disc 14a towards the second stop disc 14b and therethrough such that the disc parts 22a-c are moved towards each other and closes.

Accordingly, the valve device 10 will close immediately after the projectile has passed the disc parts 22a-c and therethrough cutting/closing for powder gases and/or muzzle flash following the projectile as it leaves the barrel 40, and therethrough delay and divert the powder gases on their way out of the valve device 10.

In such an application it will be an advantage that the valve device 10 allows some gas to escape outside the closing disc, e.g. via slots or channels 32 at the outer circumference of the second stop disc 14b, and that the valve device 10 is provided with spring-functionality, as described above, such that when the gas pressure in front of the valve device 10 drops the valve device 10 gradually opens. In this way is achieved an effective sound director and/or muzzle flash damper where powder gases/muzzle flash following a projectile is/are effectively «locked in» and delayed on their/its way out of the valve device 10.

Figure 6:
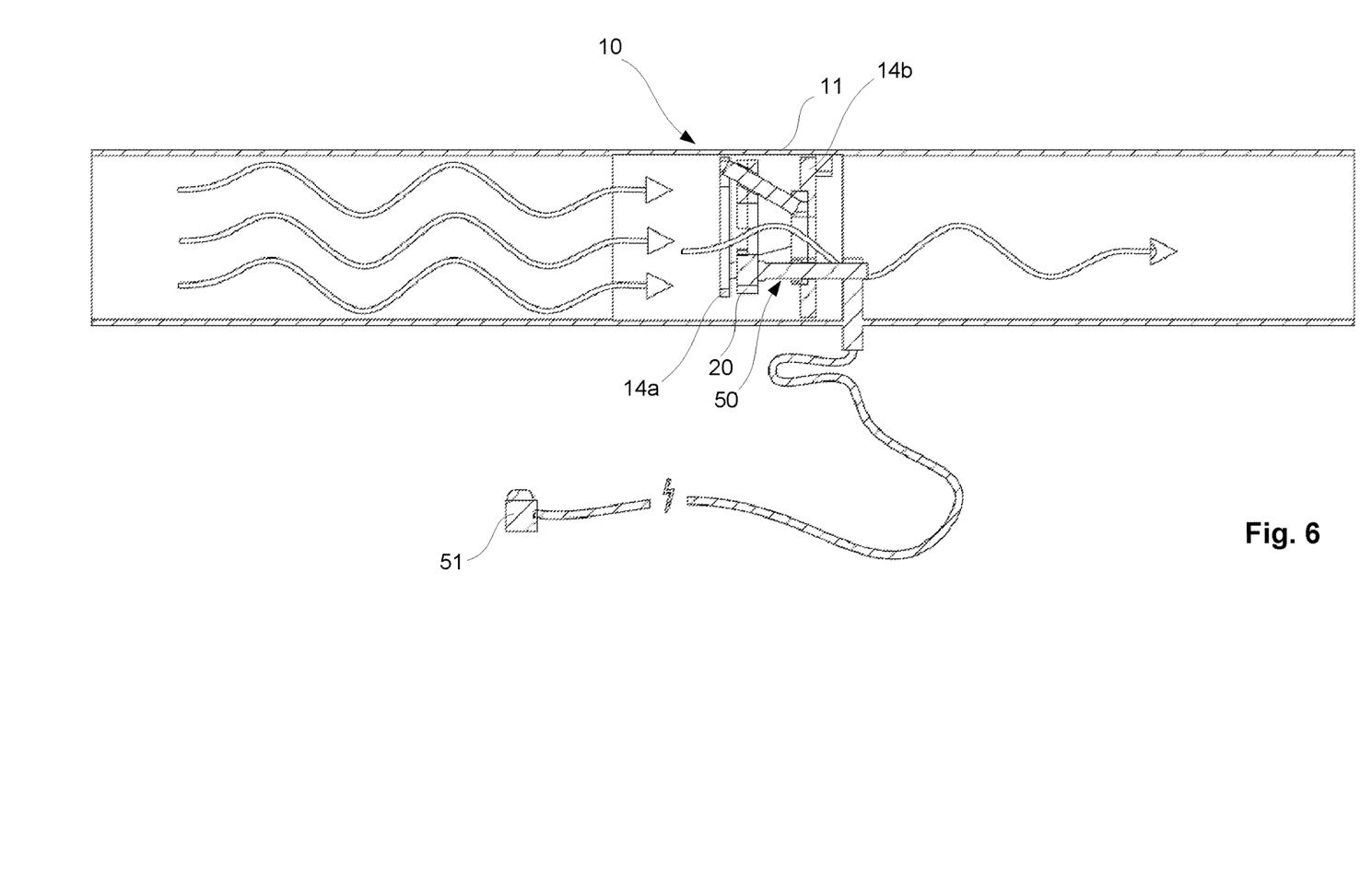
FIG. 6 shows an embodiment where the valve device is provided with an actuator mechanism.

Reference is now made to FIG. 6 showing a further embodiment of a valve device 10 where the closing mechanism is adjustable by that there is arranged an actuator mechanism 50 to the aperture box 20 capable of adjusting the aperture box 20 in longitudinal direction of the valve device 10 and therethrough determine the opening formed by the position of the disc parts 22a-c in relation to each other. In this way is enabled adjustment of the valve device 10 to a desired level/velocity of the flow of fluid, liquid or gas through the valve device 10. Alternatively, the actuator mechanism 50 is arranged to the mentioned stop discs 14a-b or bolts/rods 13a-c which can move the stop discs 14a-b/bolts/rods 13a-c in longitudinal direction of the valve device 10 and therethrough determine the opening formed by the position of the disc parts 22a-c in relation to each other. The actuator mechanism 50 itself can be electric or mechanic and of known type for a skilled person, which is controlled by a control unit 51 or manually. The control unit 51 can further be provided with various communication means and interface to known control systems and warning systems. The control unit 51 can further be connected to various sensor systems which can provide input for control of the actuator mechanism 50.

In an alternative embodiment the actuator mechanism 50 is a spring-based device which can be controlled such that the valve device 10 opens or closes at a certain pressure by determining the force of the spring-based actuator mechanism 50. In this way it can be provided a balancing valve device 10 functioning such that the pressure activates the disc parts 22a-c in larger or lesser degree depending on the pressure of the fluid, liquid or gas, and maintains the flow (of fluid, liquid or gas) at a certain level/velocity. It should be mentioned that the embodiment does not require a controllable actuator mechanism 50, but the actuator mechanism 50 can hold a desired spring force. The same can be achieved by arranging the actuator mechanism 50 to the stop discs 14a-b/bolts/rods 13a-c.

In other words the stop discs 14a-b can be movably arranged in the valve device 10 with the aperture box 20 fixed, the aperture box 20 movably arranged with the stop discs 14a-b fixed, the stop discs 14a-b movably arranged to the rods/bolts 13a-b, or a combination of several of these.

In a further embodiment of the valve device 10 the aperture box 20 is omitted such that the disc parts 22a-c via their mutual connection will be connected to the activation bolts 16a-c.

The valve device 10 can further be considered as a module-based valve device 10 where several such closing mechanisms, i.e. first 14a and second 14b stop disc, activation bolts 16a-c, possibly aperture box 20, and disc parts 22a-c, can be arranged after one another in the same tube 11 for further safety and possibly closing or opening at different pressure.

The invention claimed is:
1. A valve device (10) comprising
an outer tube (11) extending in a longitudinal direction between two opposite ends,
a connection means (12a-b) on at least one end,
rods (13a-c) extending in the longitudinal direction from the connection means (12a),
a first stop disc (14a) and a second stop disc (14b) each being arranged to the longitudinally extending rods (13a-c), wherein the first and second stop discs (14a, 14b) are longitudinally movable, activation rods (16a-c) extending between the stop discs (14a-b), the activation rods extending obliquely between the first stop disc (14a) and second stop disc (14b), a closing disc formed by at least two disc parts (22a-b) movably arranged to at least two of the activation rods (16a-c) and overlapping each other, wherein the disc parts (22a-c) exhibit slots having a configuration that the disc parts (22a-c) are forced to change relative position as the activation rods (16a-c) move in the longitudinal direction as a consequence of movement of the first stop disc (14a) and second stop disc (14b) or movement of the disc parts (22a-c) along the activation rods (16a-c) to close and open the valve device (10).

2. The valve device of claim 1, wherein the outer tube (11) includes the connection means (12a) at the one end and a cover (12c) at the other end.

3. The valve device of claim 1, wherein the rods (13a-c) are fixed and the first stop disc (14a) and second stop disc (14b) is each movable longitudinally along the fixed rods (13a-c).

4. The valve device of claim 1, wherein the first and second stop discs (14a-b) are fixed to the rods (13a-c) and the rods are longitudinally movable.

5. The valve device of claim 1, further comprising an aperture box (20) arranged between the first (14a) and second (14b) stop disc, the aperture box (20) exhibits an inner cavity for accommodating the disc parts (22a-c) of the closing disc, the aperture box (20) having slots (24a-c) through which the activation rods (16a-c) extend.

6. The valve device of claim 5, wherein the aperture box (20) is movable.

7. The valve device of claim 5, further comprising an actuator mechanism (50) arranged to one or both of the stop discs (14a-b), one or more of the rods (13a-c) or to the aperture box (20) for movement of said one or both stop discs (14a-b), one or more rods (13a-c) or aperture box (20) in the longitudinal direction.

8. The valve device of claim 5, comprising a spring-based actuator mechanism (50) arranged to one or both of the stop discs (14a-b), one or more of the rods (13a-c) or to the aperture box (20), wherein the actuator mechanism (50) is configured for activating the disc parts (22a-c) depending on a pressure of the fluid, liquid or gas.

9. The valve device of claim 1, further comprising an actuator mechanism (50) arranged to one or both of the stop discs (14a-b), one or more of the rods (13a-c) or to the aperture box (20) for movement of said one or both stop discs (14a-b), one or more rods (13a-c) or aperture box (20) in the longitudinal direction.

10. The valve device of claim 9, wherein the actuator mechanism (50) exhibits resilient properties and is configured to activate the disc parts (22a-c) depending on a pressure of the fluid, liquid or gas.

11. The valve device of claim 10, wherein the actuator mechanism (50) is arranged to a control unit (51) for manual or automatic control of the actuator mechanism (50).

12. The valve device of claim 9, wherein the actuator mechanism (50) is arranged to a control unit (51) for manual or automatic control of the actuator mechanism (50).

13. The valve device of claim 1, comprising a spring-based actuator mechanism (50) arranged to one or both of the stop discs (14a-b), one or more of the rods (13a-c) or to the aperture box (20), wherein the actuator mechanism (50) is configured for activating the disc parts (22a-c) depending on a pressure of the fluid, liquid or gas.

14. The valve device of claim 13, wherein the actuator mechanism (50) is arranged to a control unit (51) for manual or automatic control of the actuator mechanism (50).

15. The valve device of claim 1, wherein the device is configured to be arranged in a pipeline.

16. The valve device of claim 1, wherein the device is configured to be arranged in an extension of a barrel (40) of a firearm.

17. The valve device of claim 16, comprising a spring-based actuator mechanism (50) arranged for returning the disc parts (22a-c) to an open position after closing.

* * * * *